Patented June 12, 1951

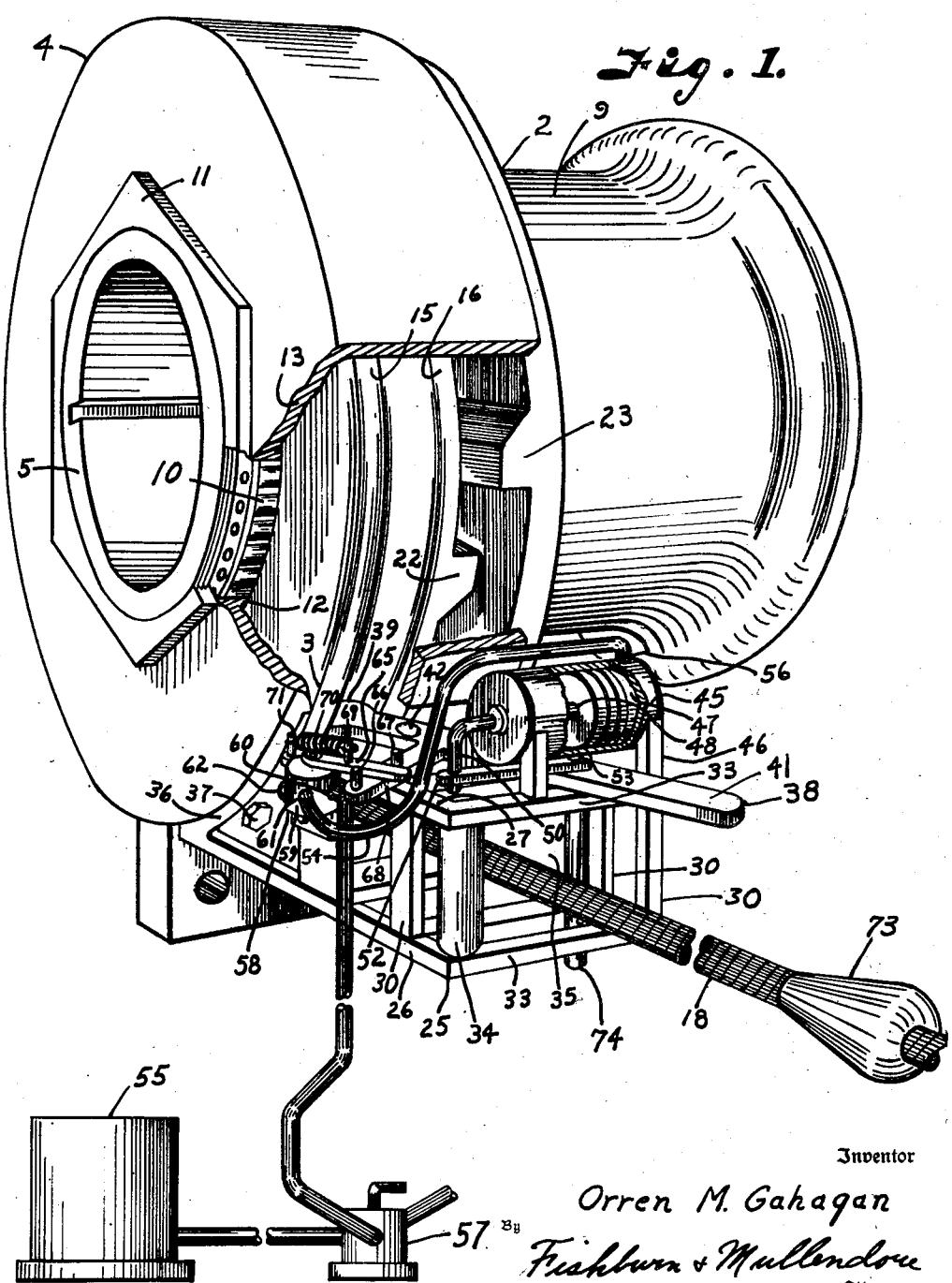

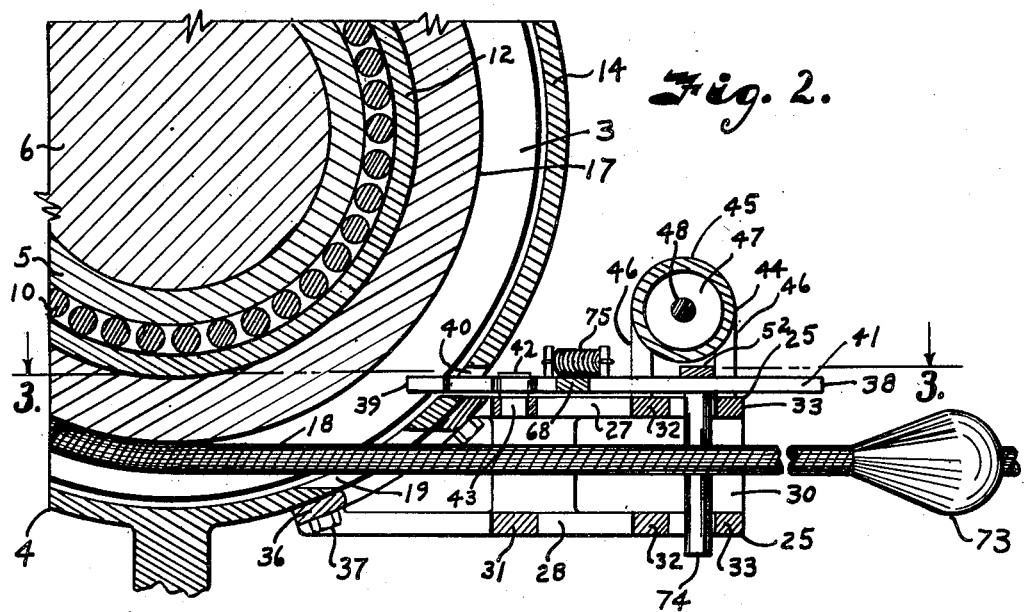
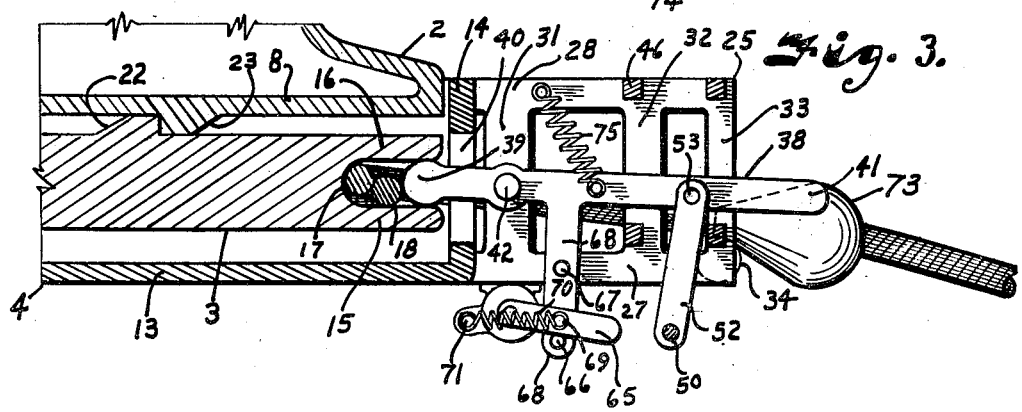
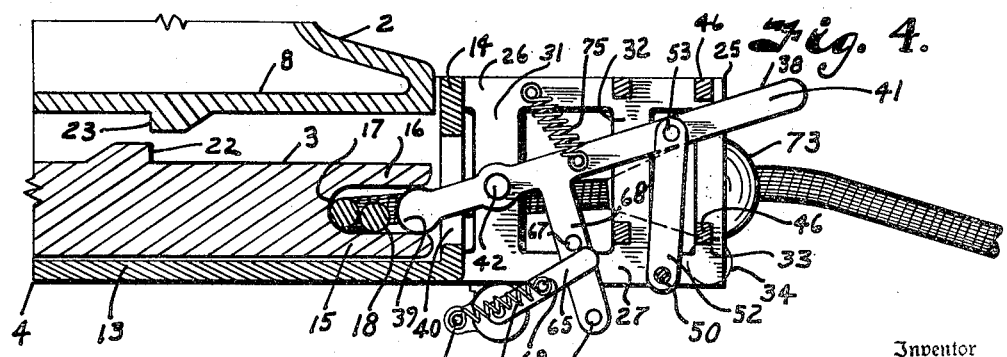
Inventor
Orren M. Gahagan

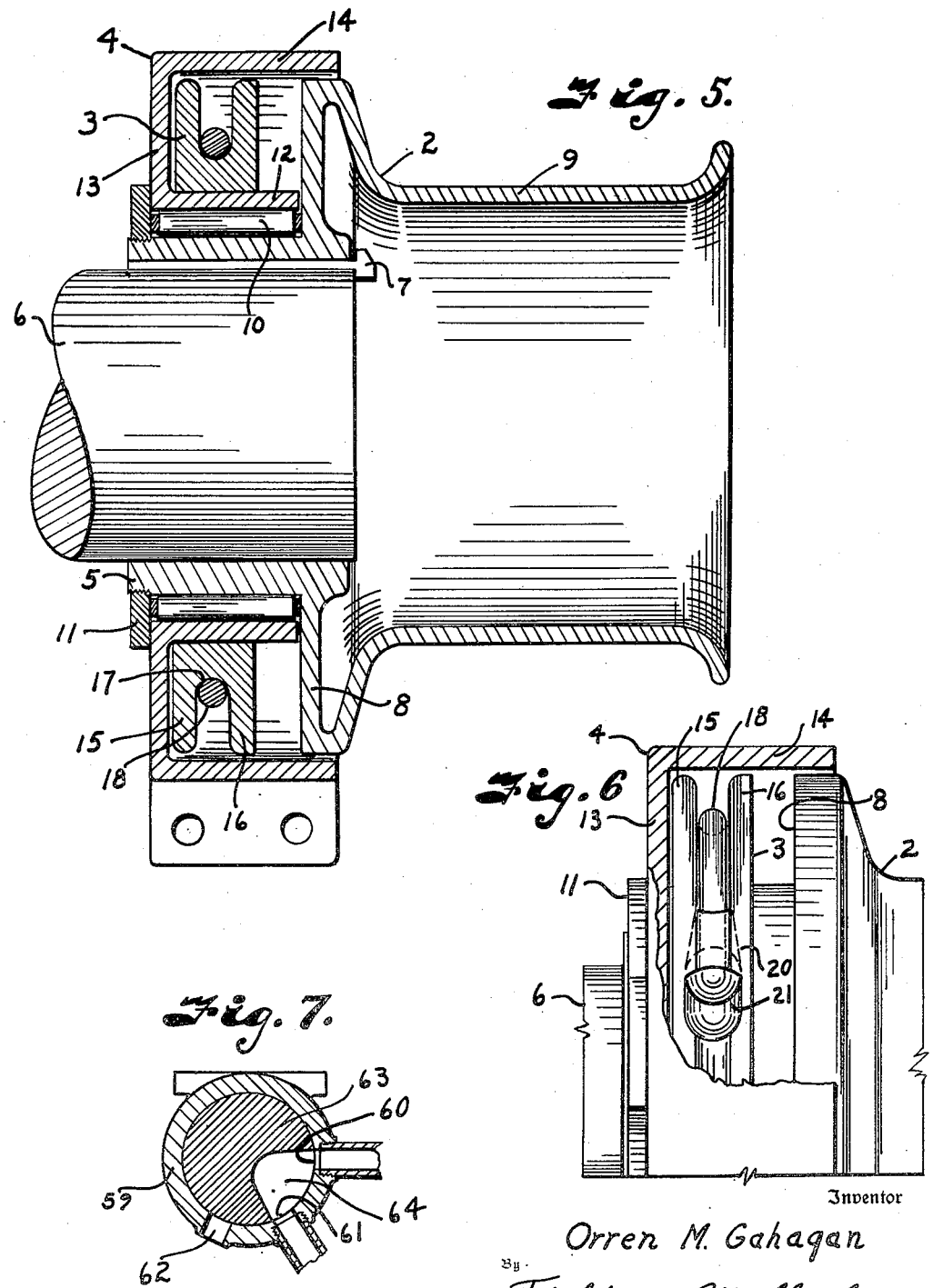

2,556,267

UNITED STATES PATENT OFFICE 2,556,267

CONTROL MECHANISM FOR AUTOMATIC CATHEADS

Orren M. Gahagan, Dallas, Tex.

Application December 5, 1947, Serial No. 789,810

11 Claims. (Cl. 254—173)

1

This invention relates to a control mechanism for automatic catheads such as used in setting up, spinning in and breaking out threaded joints as, for example, the joints of drill pipe, casing and the like during rotary drilling of a bore hole.

The principal object of the present invention is to provide a control mechanism comprising a unitary cable guide and control assembly that is readily attached to existing types of automatic catheads and which may be operated manually or by a pressure medium such as air or liquid.

Other objects of the invention are to provide a control mechanism that is of simple, lightweight construction and which eliminates the necessity of the usual rope or cable guide on the derrick floor.

In accomplishing these and other objects of the invention, I have provided improved structure, the preferred form of which is illustrated in the accompanying drawings wherein:

Fig. 1 is a perspective view of an automatic cathead equipped with a cable guide and control mechanism constructed in accordance with the present invention, the fluid pressure storage and manual control valve being shown in diagram.

Fig. 2 is a fragmentary cross section through the cathead and particularly illustrating the control mechanism.

Fig. 3 is a horizontal section on the line 3—3 of Fig. 2 showing the driven member or cable sheave in clutching engagement with the driving member of the cathead.

Fig. 4 is a similar section but showing the control mechanism being operated by a knob on the cable for effecting automatic disengagement of the driving connection between the driving and driven members.

Fig. 5 is a longitudinal section through the cathead illustrated in Fig. 1 to better illustrate mounting of the stator housing and sheave on the hub of the driving member.

Fig. 6 is a fragmentary elevational view, partly in section, to illustrate anchoring of the cable to the sheave.

Fig. 7 is a cross section through the snap action valve for automatically controlling flow of pressure medium to and from the actuating cylinder.

Referring more in detail to the drawings:

I designates a conventional form of automatic cathead which includes a driving member 2, a driven member 3 and a stator 4. The driving member has a hub 5 that is adapted for mounting on the line shaft 6 of a drawworks (not shown) and for connection therewith by a key 7. Extending radially and circumferentially at one

2 end of the hub is a radial circumferential flange 8 carrying a winding drum 9 which is ordinarily used for hoisting or moving various tools, pipe and other heavy devices used in rotary rigs. Mounted on the hub 5 is an anti-friction bearing 10 to mount the stator 4, the bearing and stator being retained from longitudinal movement on the hub by a nut 11 that is threaded on the end of the hub and which engages the stator as shown in Figs. 1 and 5.

The stator 4 includes an annular sleeve 12 extending circumferentially of the bearing 10, a radial circumferential end flange 13 spaced from the radial flange 8 of the driving member and an annular peripherial flange 14 extending to the flange 8 for providing an enclosure for the driven member 3.

The driven member 3 is axially slidable and rotatable on the sleeve 12 of the stator and comprises a ring-like body having spaced annular flanges 15 and 16 to provide a cable groove 17 in which a cable 18 is operated upon turning of the driven member. The cable 18 extends through an opening 19 in the annular flange 14 of the stator and has an enlarged end 20 that is anchored in an opening 21 formed in the bottom of the cable groove 17 as best shown in Fig. 6.

In order to connect the driven member or sheave 3 in driven relation with the driving member, the facing sides of the sheave and radial flange 8 have inwardly extending lugs 22 and 23 respectively so that when the driven member or sheave is shifted from a position adjacent the radial wall 13 of the stator toward the radial flange 8 of the driving member the lug 22 on the sheave member is engaged by the lug 23 of the driving member and the sheave is caused to rotate with the driving member and wind the cable about the sheave. The stator 4 is retained in fixed position by means of a lug 24 that may be suitably connected with a stationary part of the drawworks (not shown).

The structure of the cathead just described is somewhat conventional of standard catheads and the present invention resides primarily in a cable guide and control unit that is adapted to be attached to the stator for controlling clutching and unclutching of the sheave with the driving member as now to be described.

The cable guide and control mechanism comprises a unitary assembly since the parts thereof are mounted on a frame 25 comprising upper and lower rails 26, 27, 28 and 29 that are spaced apart vertically by interconnecting posts 30 and horizontally by tie members 31, 32 and 33. The outer tie members 33 are in substantial registry and mount a guide roller 34 at one side of a cable way 35 which is formed by the frame. The inner ends of the upper rails 26 and 27 terminate short of the ends of the lower rails 28 and 29 and the ends are connected by arcuate bars 36 which are attached to the stator in registry with the previously mentioned opening 19, the connection being made by fastening devices such as cap screws 37.

Pivotally mounted on the upper tie member 31 is a control member 38 in the form of a lever having a rounded end 39 projecting through an upper opening 40 in the stator and engaging between the flanges 15 and 16 of the sheave member. The opposite end of the lever extends along the top of the frame and terminates in the handle 41. The lever may be pivoted to the tie member 31 in any suitable manner, for example, by a stud 42 on the stud that projects into an opening 43 of the upper tie member 31 as best shown in Fig. 2.

It is thus obvious that the sheave member 3 may be moved into driven connection with the driving member 2 by grasping the handle 41 and shifting the lever in a clockwise direction (Fig. 4) so that the lug 22 on the sheave member is in position to be engaged by the lug 23 on the driving member and when the handle of the lever is shifted in the opposite direction the sheave member is moved out of clutching engagement with the driving member as shown in Fig. 4. In order to provide for operation of the lever 38 from a remote point, the frame 25 mounts a fluid pressure actuator 44 which includes a cylinder 45 disposed horizontally across the top of the lever and which is spaced thereabove by legs 46 connected with the ends of the cylinder and with the upper tie members 32 and 33 of the frame. Slidable in the cylinder 45 is a piston 47 that is connected with the piston rod 48 reciprocable through a head 49 of the cylinder and which has a depending arm 50 that projects through an opening 51 in an end of a link 52 that has its other end pivotally connected with the handle portion of the control lever by a pin 53. The cylinder is supplied with a pressure medium to effect movement of the piston through a duct 54 that is connected with a source of supply indicated at 55 and which is connected with the rear end of the cylinder as indicated at 56 (Fig. 1).

In order to control flow of pressure medium through the duct 54, the duct is provided with a manually operable control valve 57 that is preferably located in a position convenient to the driller for shutting off and establishing flow of pressure medium to the cylinder whenever it is desired to effect connection of the sheave member 3 with the driving member 2.

In order to automatically control disengagement of the sheave member 3 from the driving member 2 under action of the cable 18, it is also necessary to control flow of pressure medium to and from the cylinder 45 responsive to movement of the control lever 38. This is effected by providing an automatic valve 58 that is attached to the guide roller side of the frame and which includes a valve body 59 having an inlet connection 60 from the manual control valve 57, an outlet connection 61 to the cylinder 45, and a discharge port 62 so that the flow of pressure medium is directed from the source of supply to the actuator 44 to effect movement of the control lever 38 in the direction to shift the sheave member 3 into driven engagement with the driving member 2 and to permit discharge of the pressure medium through the discharge port 62 when the sheave member is to be disengaged from the driving member.

Control of the flow is effected by a valving member or core 63 that is rotatably mounted in the valve body and has a passageway 64 that is adapted to connect the ports 60 and 61 in one position and to connect the port 61 with the discharge port 62 in another position of the core as will be readily understood upon inspection of Fig. 7 of the drawing. The core of the valve is connected with an actuating arm 65 that extends laterally from the valve body and is adapted to be alternately engaged by pins 66 and 67 that are mounted in spaced relation on an arm 68 that extends laterally from the control lever 38 at a point near the pivoted portion thereof as best shown in Figs. 3 and 4.

In order to provide for snap action of the valve, the actuating arm 65 has a pin 69 to connect one end of a coil spring 70 having its opposite end connected to a pin 71 located on the valve body and in position to draw the actuating arm 65 to either side of dead center position. Thus, when the control lever 38 is moved under power of the pressure actuator 44, the pin 67 engages the valve actuating arm 65 to move it past dead center position whereupon the spring 70 is effective in completing movement of the valving member for closing the pressure supply port 60 and venting the pressure cylinder 45 through the ports 61 and 62 whereupon the pressure is relieved in the cylinder to permit easy return of the control lever 38 under action of a spring 75 that has one end connected with the lever and the other with a part of the frame (Figs. 3 and 4).

In order to provide for automatic disengagement of the sheave after the cable has been wound thereon, the cable is provided with a knob 73 of cone-like form and which is adapted to engage between the guide roller 34 and a pin 74 that depends from the control lever 38 as best shown in Figs. 1 and 2, the knob being so placed on the cable that when the cable has wound the desired distance on the sheave the knob will reach the roller 34 and exert a camming action on the pin 74 which shifts the control lever 38 in a counterclockwise direction and thereby effects shifting of the sheave out of driven engagement with the driving member 2.

Attention is directed to the fact that the pins 66 and 67 are so placed relative to movement of the control lever that the dead center position of the valve actuating arm 65 is near the limits of movement of the control lever.

In using the control mechanism, the frame 25 carrying the various actuating parts is secured to the stator 4 by the fastening devices 37 and the cable 18 plays through the guideway 35 of the frame. The knob 73 is properly located on the cable 18 so that when the desired stroke is effected by the sheave member 3, the knob will be in position to effect disconnection of the sheave member from the driving member. The automatic valve 58 is connected with a suitable source of pressure medium through the duct 54, the duct being extended so as to locate the manual control valve 57 in convenient position to be actuated by the driller. The normal position of the parts prior to manipulation of the cable 18 is shown in Fig. 4. In this position of the lug 22 on the sheave member 3 it is held out of position to be engaged by the lug 23 on the driving member and the valving member of automatic valve 58 is in position establishing flow of pressure fluid through the ports 60 and 61 to the pressure cylinder 45, however, flow is shut off since the manual valve 57 is closed.

For manual operation, the free end of the cable 18 is wrapped about one of the threaded members to be connected and the handle 41 of the control lever 38 is grasped by the operator to shift the sheave member 3 into position for the lug 22 thereon to be engaged by the lug 23 on the driving member whereupon the sheave is rotated under power of the drawworks to wrap the cable thereon and effect turning of the threaded member. As soon as the end of the cable slips off the threaded member the spring 75 returns the control lever to neutral position and effects disengagement of the sheave with the driving member whereupon the cable may be withdrawn from the sheave preparatory to a succeeding operation.

When the device is used for breaking out a threaded joint, the end of the cable is connected with the break-out tongs and the control lever 38 is shifted as above described to effect engagement of the sheave member with the driving member. The cable will then wrap on the sheave applying power to the tongs until the knob 73 engages the pin 74 whereupon the lever member 38 will be shifted to neutral position and the sheave member disengaged from the driving member. When the control lever 38 is to be operated under power of the fluid pressure actuator 44, the operator instead of manually shifting the control lever will open the manual valve 57 whereupon pressure fluid will flow through the ports 60 and 61 of the automatic valve to act against the piston 47 to effect shift of the control lever 38 through the link connection 52. As the control lever nears the end of its stroke, the pin 67 will engage the valve actuating arm 65 and cause snap action thereof so as to carry the passageway 64 into position for venting the pressure cylinder through the port 62. When the knob 73 engages the pin 74, the control lever is readily shifted to neutral position since the pressure fluid is relieved from the cylinder through the discharge port. As the control lever 38 approaches the end of its movement to neutral position the pin 66 engages the valve actuating arm 65 to effect re-connection of the passageway 64 with the ports 60 and 61.

From the foregoing it is obvious that I have provided a cable guide and control mechanism which may be installed as an assembled unit on the stator of a cathead so that the sheave member thereof may be controlled manually or by a pressure fluid medium. It is also obvious that I have provided a control mechanism that is of simple construction and which is adapted to operate for spinning in, breaking out or setting up of threaded joints.

What I claim and desire to secure by Letters Patent is:

1. In an automatic cathead having a driving member and a cable actuating sheave adapted to be shifted into and out of clutching engagement with the driving member, a cable connected with the sheave and adapted to wind thereon, a stator housing the sheave, a control unit adapted to be mounted on the stator including a manual actuator for effecting movement of the sheave into and out of clutching engagement, a fluid pressure actuator connected with the manual actuator for effecting said clutching engagement, means for supplying fluid pressure medium to the actuator to effect said engagement, and means connected with the actuator and responsive to winding of the cable on the sheave for releasing said fluid pressure medium to effect disengagement of the sheave.

2. In an automatic cathead having a driving member and a cable actuating sheave adapted to be connected in driving relation with the driving member, a cable adapted to wind and unwind from the sheave responsive to rotation of the sheave in alternate directions and a stator housing the sheave, a control unit adapted to be mounted on the stator including a manual actuator for effecting connection and disconnection of the driving relation of the sheave with the driving member, a fluid pressure actuator connected with the manual actuator for effecting said connection and disconnection, means for supplying fluid pressure medium to the fluid pressure actuator for shifting the manual actuator in effecting said driving connection, means remote from the manual actuator for controlling flow of pressure medium to the fluid pressure actuator, means for releasing the pressure medium, means for actuating said release means, and means on the cable engageable with a part of the release means to effect release of the pressure medium.

3. In an automatic cathead having a driving member and a cable actuating sheave adapted to be driven with the driving member and a stator housing the sheave, a control mechanism for effecting driving connection of the sheave with the driven member comprising a frame adapted for attachment to the stator and forming a guide for the cable operated by said sheave, a control member movably mounted on said frame, a fluid pressure actuator mounted on the frame, an operating connection between the fluid pressure actuator and the control member, a duct connected with the actuator for supplying a fluid pressure medium, a valve in said duct for controlling flow of the fluid pressure medium to the actuator to effect movement of the control member in one direction and having a discharge port for releasing said pressure medium from the actuator, an operating connection between the control member and the valve responsive to movement of the control member by said fluid pressure actuator to shut off flow of pressure medium and effect discharge of pressure medium from the actuator, means on the cable for engaging a part on the control member for effecting actuation of the control member in the opposite direction and to actuate the valve for reestablishing flow of pressure medium to the fluid pressure actuator, and manual means for controlling flow of the fluid pressure medium to said valve.

4. In an automatic cathead having a driving member and a cable actuating sheave adapted to be driven by the driving member and a stator housing the sheave, a control mechanism for effecting driving connection of the sheave with the driving member comprising a frame adapted for attachment to the stator and forming a guide for the cable operated by said sheave, a control member movably mounted on said frame, a fluid pressure actuator mounted on the frame, an operating connection between the fluid pressure actuator and the control member, a duct connected with the actuator for supplying a fluid pressure medium, a valve in said duct for controlling flow of the fluid pressure medium to the actuator to effect movement of the control member in one direction to effect said driving connection and having a discharge port for releasing said pressure medium from the actuator, a snap action movement for said valve, an operating connection between the lever and the snap action movement to shut off flow of pressure medium and effect discharge of pressure medium from the actuator, means on the cable for engaging a part of the control member for effecting actuation of the control member in the opposite direction to actuate the valve for re-establishing flow of pressure medium to the fluid pressure actuator, and manual means for controlling flow of the fluid pressure medium to said valve.

5. In an automatic cathead having a driving member and a cable actuating sheave adapted to be shifted into and out of clutching engagement with the driving member and a stator housing the sheave, a control mechanism for effecting movement of the sheave into and out of said clutching engagement comprising a frame adapted for attachment to the stator and forming a guide for the cable operated by said sheave, a control member movably mounted on said frame and having connection with the sheave to effect shifting of the sheave, a fluid pressure actuator mounted on the frame, an operating connection between the fluid pressure actuator and the control member, a duct connected with the actuator for supplying a fluid pressure medium, a valve in said duct mounted on said frame for controlling flow of the fluid pressure medium to the actuator to effect movement of the control member to shift the sheave into clutching engagement with the driving member and having a discharge port for releasing said pressure medium from the actuator, an operating connection between the control member and the valve responsive to movement of the control member by said fluid pressure actuator to shut off flow of pressure medium and effect discharge of pressure medium from the actuator, means on the cable for engaging a part on the control member for effecting actuation of the control member in a direction to move said sheave out of clutching engagement with the driving member and to actuate the valve for re-establishing flow of pressure medium to the fluid pressure actuator, and manual means for controlling flow of the fluid pressure medium to the valve.

6. A control mechanism for effecting driving connection between a driving and driven member including a frame forming a guide for a cable that is to be operated by the driven member, a control member movably mounted on said frame, a fluid pressure actuator mounted on the frame, an operating connection between the fluid pressure actuator and the control member, a duct connected with the actuator for supplying a fluid pressure medium, a valve in said duct for controlling flow of the fluid pressure medium to the actuator to effect movement of the control member in one direction and having a discharge port for releasing said pressure medium from the actuator, an operating connection between the control member and the valve responsive to movement of the control member by said fluid pressure actuator to shut off flow of pressure medium and effect discharge of pressure medium from the actuator, means on the cable for engaging a part on the control member for effecting actuation of the control member in the opposite direction and to actuate the valve for reestablishing flow of pressure medium to the fluid pressure actuator, and manual means for controlling flow of the fluid pressure medium to said valve.

7. A control mechanism for effecting driving connection between a driving and driven member comprising a frame forming a guide for the cable to be operated by said driven member, a control member movably mounted on said frame, a fluid pressure actuator mounted on the frame, an operating connection between the fluid pressure actuator and the control member, a duct connected with the actuator for supplying a fluid pressure medium, a valve in said duct for controlling flow of the fluid pressure medium to the actuator to effect movement of the control member in one direction to effect said driving connection and having a discharge port for releasing said pressure medium from the actuator, a snap action movement for said valve, an operating connection between the lever and the snap action movement to shut off flow of pressure medium and effect discharge of pressure medium from the actuator, means adapted to be attached to said cable for engaging a part of the control member for effecting actuation of the control member in the opposite direction to actuate the valve for re-establishing flow of pressure medium to the fluid pressure actuator, and manual means for controlling flow of the fluid pressure medium to said valve.

8. A control mechanism comprising a frame forming a guide for a cable, a control member movably mounted on said frame and having connection with the sheave to effect shifting of the sheave, a fluid pressure actuator mounted on the frame, an operating connection between the fluid pressure actuator and the control member, a duct connected with the actuator for supplying a fluid pressure medium, a valve in said duct mounted on said frame for controlling flow of the fluid pressure medium to the actuator to effect movement of the control member and having a discharge port for releasing said pressure medium from the actuator, an operating connection between the control member and the valve responsive to movement of the control member by said fluid pressure actuator to shut off flow of pressure medium and effect discharge of pressure medium from the actuator, means adapted to be attached to said cable for engaging a part on the control member for effecting actuation of the control member in a direction to move said sheave out of clutching engagement with the driving member and to actuate the valve for re-establishing flow of pressure medium to the fluid pressure actuator, and manual means for controlling flow of the fluid pressure medium to the valve.

9. An apparatus of the character described including a driving member and a sheave adapted to be rotated thereby, said sheave and driving member having interengaging means, a control mechanism for effecting connection and disconnection of the sheave from the driving member including a cable guide, an actuator for effecting said connection and disconnection, a fluid pressure means having connection with the actuator, a cable on the sheave and operable through the cable guide, a knob on the cable, and knob engaging means on said actuator cooperating with the cable guide for effecting movement of the actuator to disconnect the sheave from the driving member.

10. An apparatus of the character described including a driving member and a sheave adapted to be rotated thereby, said sheave and driving member having interengaging means, a control mechanism for effecting connection and disconnection of the sheave from the driving member including a cable guide, an actuator for effecting said connection and disconnection, a fluid pressure means having connection with the actuator, a cable on the sheave and operable through the cable guide, a knob on the cable, knob engaging means on said actuator cooperating with the cable guide for effecting movement of the actuator to disconnect the sheave from the driving member, and a fluid pressure release means having a snap action connection with the actuator for effecting release of pressure medium from the fluid pressure means.

11. In an apparatus of the character described including a driving member and a relatively axially movable cable actuating sheave, said sheave and driving member having interengageable means adapted to connect and disconnect said driving member and sheave responsive to shifting of the sheave axially with respect to the driving member, a control mechanism including a cable guide, shifting means for effecting said interengagement of the cable actuating sheave with the driving member, a cable on said sheave and operable through the cable guide, fluid pressure means having connection with the shifting means for effecting said interengagement from a position remote from the shifting means, a knob on the cable, and knob engaging means on said shifting means cooperating with the cable guide for effecting actuation of the shifting means to effect shift of the sheave.

ORREN M. GAHAGAN.

REFERENCES CITED

The following references are of record in the file of this patent:

UNITED STATES PATENTS

| Number | Name | Date |
|---|---|---|
| 1,472,726 | McLaughlin | Oct. 30, 1923 |
| 1,526,025 | Street | Feb. 10, 1925 |
| 1,704,596 | Emmert | Mar. 5, 1929 |
| 1,801,259 | Barks | Apr. 21, 1931 |
| 1,855,801 | Kelly | Apr. 26, 1932 |
| 2,090,575 | DeMotte | Aug. 17, 1937 |
| 2,449,376 | Gahagan | Sept. 14, 1948 |